H. JUNKERS.
CYLINDER FOR INTERNAL COMBUSTION ENGINES.
APPLICATION FILED DEC. 1, 1916.
1,410,319.
Patented Mar. 21, 1922.
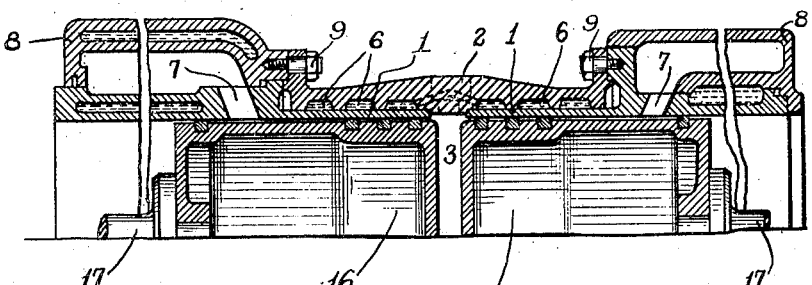
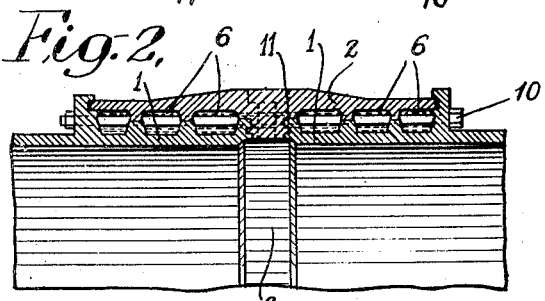
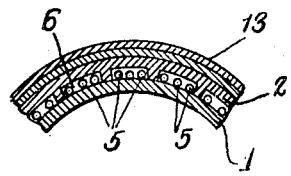
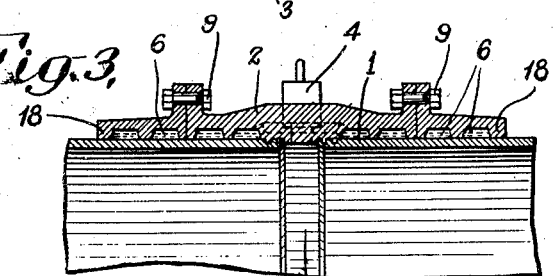
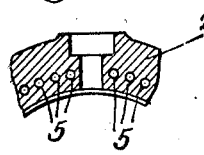
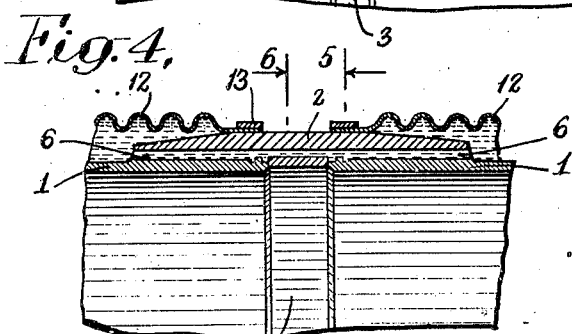
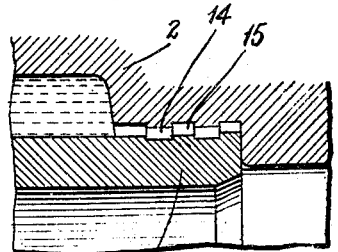
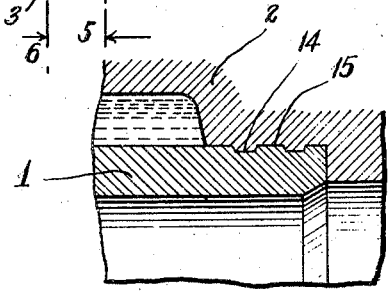
INVENTOR.
Hugo Junkers,
BY
ATTORNEYS.

UNITED STATES PATENT OFFICE.

HUGO JUNKERS, OF AACHEN, GERMANY, ASSIGNOR, BY MESNE ASSIGNMENTS, TO OPPOSED PISTON OIL ENGINE CO., INC., A CORPORATION OF NEW YORK.

CYLINDER FOR INTERNAL-COMBUSTION ENGINES.

1,410,319. Specification of Letters Patent. Patented Mar. 21, 1922.

Original application filed June 25, 1913, Serial No. 775,693. Divided and this application filed December 1, 1916. Serial No. 134,436.

*To all whom it may concern:*

Be it known that I, HUGO JUNKERS, a citizen of Germany, residing at Aachen, Germany, have invented certain new and useful Improvements in Cylinders for Internal-Combustion Engines; and I do hereby declare the following to be a full, clear, and exact description of the invention, such as will enable others skilled in the art to which it appertains to make and use the same.

This invention relates to the construction of cylinders for internal combustion engines of the type having two pistons reciprocating within the cylinder structure in opposite directions simultaneously. This application constitutes a division of an application filed by me on June 25, 1913, and serially numbered 775,693. In that application is described a cylinder structure comprising a liner constituting a guide for the pistons, which possesses insufficient strength to withstand the strains resulting from the combustion of gases therein, and a reinforcing ring surrounding this liner and serving to resist the pressure within the liner, either or both the liner and the ring being so formed as to provide spaces for a cooling medium which comes in direct contact with the exterior surfaces of the relatively thin liner and is therefore the more effective in carrying off heat therefrom. The present invention involves the production of a cylinder structure of this same type constructed in a particular manner whereby important advantages are secured.

The cylinder structure constructed in accordance with the present invention comprises two thin liners of insufficient strength to withstand the pressure of combustion and constituting guides for the two pistons, these two liners being arranged in axial alignment with their adjacent ends spaced apart, and a strengthening ring closely embracing the adjacent ends of the two liners, the space within this reinforcing ring and between the adjacent ends of the liners forming the combustion chamber of the engine. The strengthening ring, in addition to receiving and supporting the adjacent ends of the two liners, extends over substantial portions of the liners so as to relieve them of the strains incident to the combustion of gases therein and either or both the ring and the liners are formed so as to provide passages between them for the flow of a cooling medium which comes in direct contact with the exterior surfaces of the liners. By this construction, effective cooling of the cylinder structure may be obtained by reason of the fact that the cooling medium is carried into contact directly with the outer walls of the guides for the pistons which walls are very thin, so thin that they do not possess the strength required for resisting the strains resulting from the combustion of the gases therein. At the same time, the application of valve devices to the cylinder structure is greatly simplified, for these valve devices may be mounted upon the reinforcing ring and may extend through openings therein to the combustion chamber; in other words, these valve devices do not extend through the liners which, by reason of their shape and thickness and the material employed therein, would be particularly liable to rupture or distortion about openings therein for valves. The reinforcing ring, on the other hand, may be made of ample thickness and of a material possessing great tensile strength which will readily withstand the strains incident to securing valve devices in openings extending therethrough. Furthermore, this construction facilitates the provision of adequate means for cooling the portion of the cylinder structure about the combustion chamber and particularly the parts immediately surrounding the openings for valve casings. As above stated, ample passages for a cooling liquid are provided between the liners and the reinforcing ring; in addition to these, a plurality of ducts may be provided extending through the reinforcing ring from the cooling passages on one side of the combustion chamber to those on the other and certain of these ducts may be carried close to any openings through the reinforcing ring provided for the reception of valve devices.

The reinforcing ring is employed as the medium for supporting the adjacent ends of the two liners and holding them in proper relative positions. This is preferably done by shrinking the reinforcing ring upon the liners. The liners and ring are provided with corresponding circumferential grooves and flanges which are brought into co-action by sliding the ring upon the liners while it is hot and thoroughly expanded and then cooling it. In this way, the proper mechanical connection of the liners and reinforcing ring is effected and in addition these parts are united so snugly as to preclude leakage of the cooling liquid through the joint to the interior of the cylinder.

I have illustrated the preferred embodiment of my invention in the accompanying drawings in which Fig. 1 is a longitudinal section of a cylinder structure constructed in accordance with the invention, showing the two pistons therein; Fig. 2 is a view similar to the central portion of Fig. 1, showing the use of long bolts for holding the parts together; Fig. 3 is a view similar to Fig. 2 illustrating a further modification; Fig. 4 is a view similar to Fig. 2 showing a structure in which the passages for the cooling medium extend axially; Figs. 5 and 6 are transverse sections of lines 5—5 and 6—6 of Fig. 4; and Figs. 7 and 8 are views illustrating steps in the assemblage of the parts shown in Figs. 3 and 4.

In all of the figures of the drawing, 1, 1, designate the two liners and 2 designates the reinforcing ring, the two liners being arranged in axial alignment with their adjacent ends spaced apart and the strengthening ring closely embracing the adjacent ends of these two liners.

The pistons are shown at 16, each having a piston rod 17 connected thereto; these two pistons are adapted to reciprocate in opposite directions simultaneously and each liner 1 forms a guide for one of the pistons in its reciprocating movement. In Fig. 1 the pistons are illustrated at the end of their movement toward each other. The space 3 between the two pistons and within the portion of the reinforcing ring lying between the adjacent ends of the liners constitutes the combustion chamber. In that portion of the reinforcing ring is an opening for the reception of a valve casing as shown at 4 in Fig. 3.

In Fig. 1, the reinforcing ring 2 is shown as fitting snugly upon the two liners 1. At the right, the ring is shown as bolted by bolts 9 to a flange on the liner 1. At the left, a part of the casing 8 of the engine is shown as bolted to the ring 2 by the bolts 9 and flanged to co-act with a corresponding flange on the liner 1. The exhaust ports are shown at 7. Passages for a cooling medium are provided between the reinforcing ring and the liners so that the cooling medium will come in direct contact with the exterior surfaces of the liners. In Fig. 1, provision for such passages is made by forming circumferential ribs upon the interior of the ring 2 so that passages 6 are formed between these ribs. The portion of the ring 2 against which the adjacent ends of the liners abut consists of an interior and annular projection and the opening for the valve casing 4 passes through this projection as is indicated by the dotted lines. In order to insure proper cooling of all of the cylinder structure and facilitate the flow of the cooling medium through the passages 6, a plurality of ducts 5 are provided extending through this interior annular projection as is indicated by the dotted lines. Two of these ducts 5 are located on opposite sides of and close to each opening for a valve casing 4, so as to guard against overheating of these parts.

In Fig. 2, the adjacent ends of the liners 1 are provided with grooves 11 corresponding with ribs upon the interior annular projection of the reinforcing ring 2. These parts are assembled as is indicated in Fig. 2, and are held together by means of elongated bolts 10 as shown. In the construction illustrated in Fig. 2, the passages 6 for the cooling medium are formed partly in the reinforcing ring 2 and partly in the liners 1.

In Figs. 3 and 4, the co-acting grooves and ribs of the liners and ring are formed on surfaces which parallel the axis instead of being transverse to the axis as in the case of the Fig. 2 construction. The parts may, therefore, be secured together rigidly and tight joints effected between them by shrinking the ring 2 upon the ends of the liners. This operation is illustrated in Figs. 7 and 8 wherein 15 indicates ribs on the liners adapted to enter grooves on the ring and 14 indicates ribs on the ring adapted to enter grooves on the liners. Fig. 7 shows the positions of the parts after the ring has cooled and shrunk into position upon the ends of the liners. By assembling the parts in this way, a structure of great strength is provided, the two liners are held rigidly in position in axial alignment and the proper distance apart, movement of the liners toward or away from each other is effectually prevented and the joints between the liners and the reinforcing ring are so tight as to eliminate the danger of loss of pressure therethrough or leakage of the cooling liquid to the interior of the cylinder structure.

In Fig. 3, the ring 2 has extensions 18 secured thereto by means of bolts 9. In Fig. 4, the channels for the cooling medium extend in the direction of the axis instead of circumferentially as in the preceding figures. For this purpose the reinforcing ring 2 is provided with lengthwise grooves on the interior thereof forming the passages 6 for the cooling medium and ducts 5 extending through the interior annular projection of the ring 2 connect the passages 6 on opposite sides of that projection. Also, by means of the construction shown in Fig. 4, the cooling medium is applied to the exterior of the reinforcing ring 2. For this purpose the cooling water is confined by an elastic casing 12 which is secured to the exterior of the ring 2 by bands 13.

I claim:

1. A cylinder structure for an engine having two pistons reciprocating simultaneously in opposite directions comprising two thin liners constituting guides for the pistons arranged in axial alignment with their adjacent ends spaced apart and a strengthening ring closely embracing the adjacent ends of the liners and forming a combusion chamber within the ring and between the ends of the two liners.

2. A cylinder structure for an engine having two pistons reciprocating simultaneously in opposite directions comprising two thin liners constituting guides for the two pistons arranged in axial alignment with their adjacent ends spaced apart, and a strengthening ring embracing the adjacent ends of the two liners and providing spaces for a cooling medium between it and the two liners, the space within the ring and between the adjacent ends of the liners constituting a combustion chamber.

3. A cylinder structure for an engine having two pistons reciprocating simultaneously in opposite directions comprising two thin liners constituting guides for the two pistons arranged in axial alignment with their adjacent ends spaced apart, and a strengthening ring embracing the adjacent ends of the two liners and providing spaces for a cooling medium between it and the two liners, the space within the ring and between the adjacent ends of the liners constituting a combustion chamber and the ring having ducts formed therein connecting the spaces for the cooling medium about the two liners.

4. A cylinder structure for an engine having two pistons reciprocating simultaneously in opposite directions comprising two thin liners constituting guides for the two pistons arranged in axial alignment with their adjacent ends spaced apart, a strengthening ring embracing the adjacent ends of the two liners and providing spaces for a cooling medium between it and the two liners, the space within the ring and between the adjacent ends of the liners constituting a combustion chamber, and a valve mounted upon the ring and extending therethrough to the combustion chamber.

5. A cylinder structure for an engine having two pistons reciprocating simultaneously in opposite directions comprising a strengthening ring of tubular form having an interior annular projection, and two tubular guides for pistons having their ends entering the ring and secured to the projection, the ring and liners being formed to provide spaces between them for a cooling medium.

6. A cylinder structure for an engine having two pistons reciprocating simultaneously in opposite directions comprising a strengthening ring of tubular form having an interior annular projection and two tubular guides for pistons having their ends entering the ring and secured to the projection, the ring and liners being formed to provide spaces between them for a cooling medium, and the ring having ducts formed therein bridging the projection and connecting the spaces for the cooling medium.

7. A cylinder structure for an engine having two pistons reciprocating simultaneously in opposite directions comprising a strengthening ring of tubular form having an interior annular projection, two tubular guides for pistons having their ends entering the ring and secured to the projection, the ring and liners being formed to provide spaces between them for a cooling medium, and a valve mounted on the ring and passing through the portion thereof on which the projection is formed to the combustion chamber located therein.

8. A cylinder structure for an engine having two pistons reciprocating simultaneously in opposite directions comprising a strengthening ring and two liners mounted therein and constituting guides for the pistons, the interior of the ring and the adjacent ends of the liners having grooves and flanges thereon which are brought into co-action to unite the ring and the liners by shrinking the ring upon the ends of the liners.

9. A cylinder structure for an engine having two pistons reciprocating simultaneously in opposite directions comprising a strengthening ring and two liners mounted therein and constituting guides for the pistons, the ring and liners being formed to provide spaces between them for a cooling medium and the ring and the adjacent ends of the liners having grooves and flanges thereon which are brought into co-action by shrinking the ring on the liners to unite the ring and the liners and prevent escape of the cooling medium from said passages to the interior of the cylinder.

10. A cylinder structure for an engine having two pistons reciprocating simultaneously in opposite directions, comprising two thin liners constituting guides for the pistons arranged in axial alignment and so disposed that one piston reciprocates within and between the ends of each of the liners, and a strengthening ring closely embracing the adjacent ends of the liners.

In testimony whereof I affix my signature.

HUGO JUNKERS.